Oct. 24, 1967  V. A. HALL  3,348,572
PORTABLE SOURCE OF FLUID
Filed Oct. 21, 1965  2 Sheets-Sheet 1

INVENTOR.
VRIEL A. HALL
BY
*Harry C. Jieners*
ATTORNEY

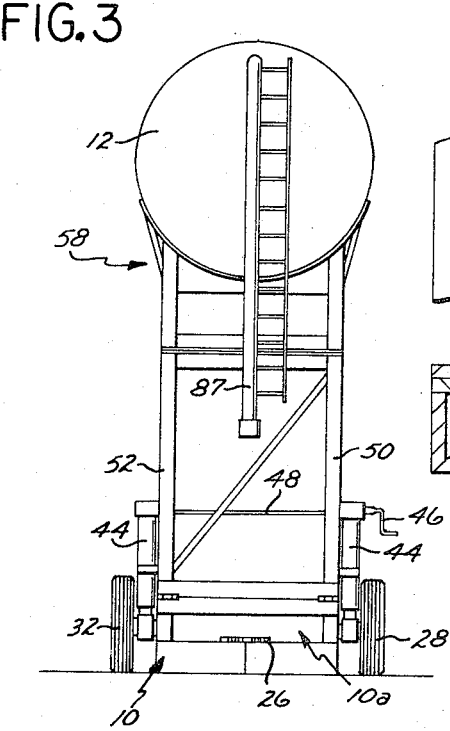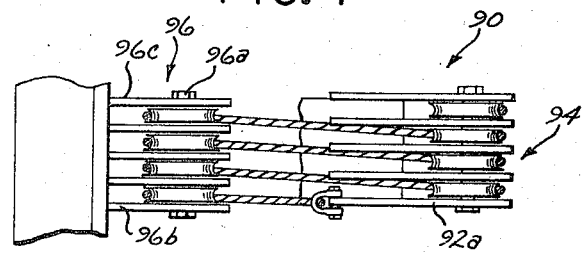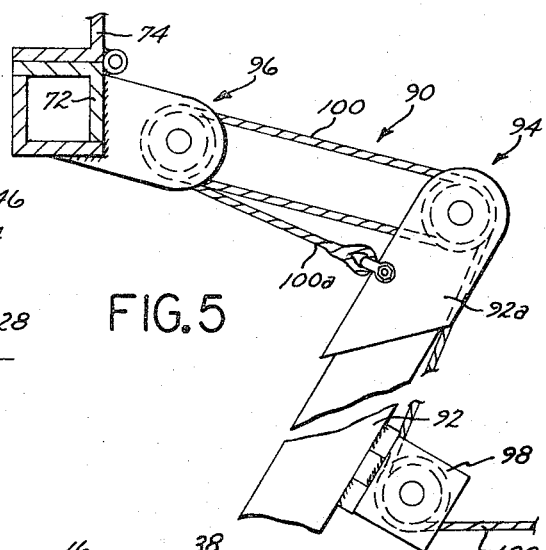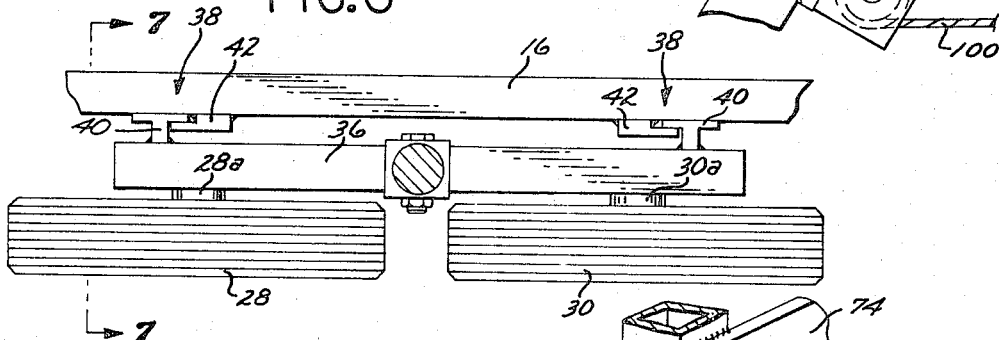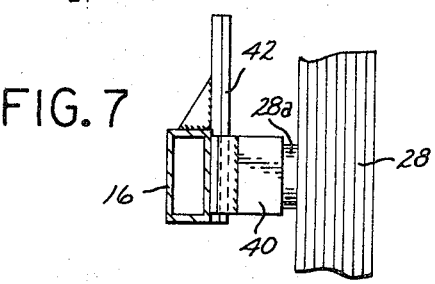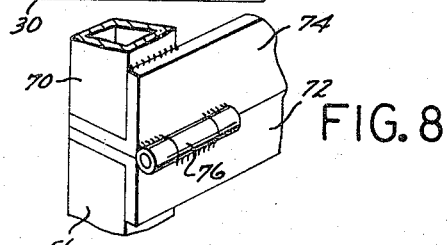

3,348,572
PORTABLE SOURCE OF FLUID
Vriel A. Hall, 503 Ave. Presidio,
San Clemente, Calif. 92672
Filed Oct. 21, 1965, Ser. No. 500,041
6 Claims. (Cl. 137—344)

ABSTRACT OF THE DISCLOSURE

This invention pertains to a mobile water tank for use at locations remote from sources of water, such as at construction sites. Typically such sources of water are employed to carry large quantities of water and to be used to refill other mobile tank units.

More particularly, this invention pertains to a combination of unique structure for raising and lowering a relatively large tank including hinged support members between the tank frame and a main lower frame, a block and tackle unit for providing the necessary mechanical advantage, and retractable wheels for carrying the lower main frame but which can be retracted to enable the frame to securely rest on the ground.

---

The present invention relates generally to portable sources of fluid, and more particularly to means for providing water at relatively remote locations.

In certain areas of the United States, large tracts of homes are being built today in relatively arid climates. This is particularly true of the southwestern portion of the United States, which is predominated with deserts and other locations which are devoid of adequate water supply.

The construction industry requires water at the job site for various reasons. Such water must be brought into the particular area since many of the large construction jobs are in relatively remote locations away from natural or domestic water sources. To accomplish this, tanks of water are hauled to the job site. However, such tanks must be relatively large because exceptionally large quantities of water are required. Also, such tanks must be elevated to permit water to flow from the tank into mobile water carriers such as trucks and the like. That is, the water from the tank must be easily taken therefrom and put into a mobile carrier so that the water can be sprayed over the ground or taken to a particular location at the job site. Although pumping means could be utilized for this purpose, the lack of available power and other facilities at a new job site makes it desirable to utilize gravity for causing the water to flow from the tank into the mobile carrier. This, of course, requires that the tank be raised to an elevated position so that the water will flow into the mobile carrier when a valve is opened.

Heretofore such portable sources of fluid have been difficult to transport from one location to another and somewhat inoperative in raising the tank to its desired elevated position. The movement of the tank between raised and lowered positions is necessitated by the fact that in transporting the tank while filled with water or other fluid it is necessary to have it in its lowermost position. This causes the center of gravity to be relatively low and prevents the tank from tipping and from hitting overhead objects such as bridges, trees and the like.

It is an object of the present invention to provide a portable source of fluid which can be easily transported to substantially any remote location.

Another object of the present invention is to provide a portable source of fluid as characterized above having actuating means for raising and lowering the tank, which means is easy to operate and does not require unavailable sources of power.

A further object of the present invention is to provide a portable source of fluid as characterized above wherein the fluid tank is maintained in a horizontal position throughout the raising and lowering operation.

An even further object of the present invention is to provide a portable source of fluid as characterized above wherein wheels are provided on the mechanism, such wheels being retractable to permit the entire unit to rest on the ground at the job site.

A still further object of the present invention is to provide a portable source of fluid as characterized above wherein the tank is provided with a discharge pipe which is substantially automatically retracted upon the tank being lowered and which is extended to a raised position beyond the frame members when the tank is raised to permit mobile carriers to be positioned therebeneath.

Another object of the present invention is to provide a portable source of fluid as characterized above which is simple and inexpensive to manufacture and which is rugged and dependable in operation.

The novel features which I consider characteristic of my invention are set forth with particularity in the appended claims. The device itself, however, both as to its organization and mode of operation, together with additional objects and advantages thereof, will best be understood from the following description of specific embodiments when read in connection with the accompanying drawings, in which:

FIGURE 3 is an end view of such source;

FIGURE 4 is a fragmentary view, taken substantially along line 4—4 of FIGURE 1;

FIGURE 5 is a side elevational view of FIGURE 4;

FIGURE 6 is a fragmentary top plan view, taken substantially along line 6—6 of FIGURE 2;

FIGURE 7 is a fragmentary sectional view, taken substantially along line 7—7 of FIGURE 6; and FIGURE 8 is a fragmentary view of a portion of the raising and lowering mechanism.

Like reference characters indicate corresponding parts throughout the several views of the drawings.

Figure 1:
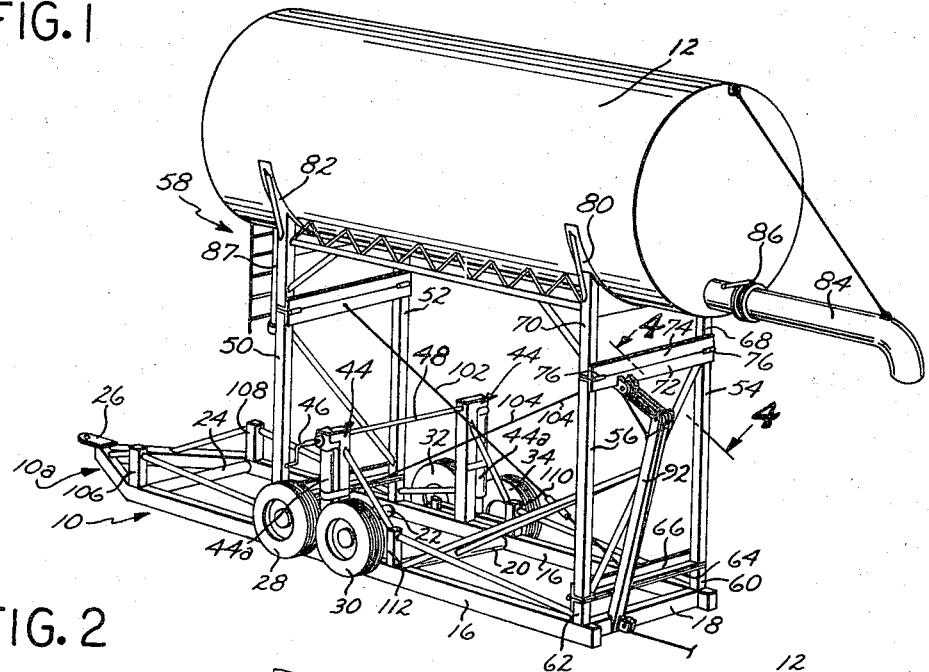
FIGURE 1 is a perspective view of a portable source of fluid according to the present invention.

Referring to FIGURE 1 of the drawings, there is shown therein a preferred embodiment of the present invention. Such embodiment generally comprises a main frame 10 whereon is mounted a fluid tank 12.

Main frame 10 comprises a pair of longitudinal members 14 and 16 which are joined together, as by welding and the like, with suitable lateral members 18, 20, 22 and 24. The forward end 10a of main frame 10 is provided with a tongue 26 to facilitate attachment of the main frame to a truck or other appropriate hauling means.

The various members of main frame 10 are formed of steel and are provided with rectangular, square or round cross sections to provide the necessary strength and rigidity to the frame. Such members are welded together to provide a structure capable of withstanding the relatively high forces to be applied thereto.

Mounted relative to main frame 10 are suitable wheels 28, 30, 32 and 34 which enable the frame to be pulled over the ground or roadway, as will hereinafter become apparent.

As shown most clearly in FIGURE 6 of the drawings, wheels 28 and 30 are attached to a support member 36 which is movably positioned adjacent the frame member 16. The wheels 28 and 30 are provided with axles 28a and 30a which are appropriately anchored in the support member 36.

To prevent the support member 36 and wheels 28 and 30 from moving out of proper position, suitable positioning means 38 is provided at each end of member 36. Such positioning means comprises a T-shaped locking member 40 welded to each end of support member 36, and an L-shaped locking member 42 for each member 40 welded to frame member 16. Such locking members are provide with extensions which are engaged to prevent movement of support member 36 is all directions other than the vertical direction. As seen in FIGURE 6 of the drawings, two positioning devices 38 are provided on each support member 36.

The wheels 32 and 34 are also mounted on a support member, the latter of which is also restricted to vertical movement by virtue of suitable positioning devices, as hereinabove described.

Mounted on frame members 16 on opposite sides of main frame 10 are actuating devices 44. A manual operating lever 46 is provided at one of the actuating devices and an interconnecting rod 48 is employed to cause the devices to be operated simultaneously.

Each of the actuating devices 44 further comprises elements 44a, the lower portions of which are connected to the respective support members at the wheels. The mechanism within the elements 44a responds to rotation of manual lever 46 to raise and lower the support members as desired. Thus, as manual lever 46 is rotated in one direction, the main frame 10 is lowered until it is at ground level. Likewise, when such lever is rotated in the opposite direction, the frame is raised a corresponding distance above the ground.

Suitable support members 50, 52, 54 and 56 are provided for a support frame 58.

Each such support member is hingedly connected to both the main frame 10 and to the tank support frame 58. They may be formed of structural steel of substantially any appropriate design, and are preferably provided with a square cross section to provide the necessary strength and rigidity.

As shown with respect to support members 54 and 56, short sections of structural members 60 and 62 are welded to the main frame 10. Suitable hinge means in the form of a pair of angle members 64 and 66 are connected respectively to the structural members 60 and 62, and to the bottom of support members 54 and 56 as shown most clearly in FIGURE 1 of the drawings. Such angle members 64 and 66 are hingedly connected together so as to enable the support members 54 and 56 to pivot forwardly on frame 10.

The upper ends of support members 54 and 56 are hingedly connected to structural members 68 and 70, the latter of which are part of the aforementioned support frame 58. Suitable angle members 72 and 74 are provided with suitable hinges as shown at 76 in FIGURE 8 to enable the support members 54 and 56 to pivot thereabout.

The forward support members 50 and 52 are, in like fashion, hinged to structural members which are welded to the main frame 10. Also, the upper ends of support members 50 and 52 are hingedly connected to the support frame 58 as shown in FIGURE 1 of the drawings.

The support frame 58 may be provided with any appropriate structural members, but must comprise a pair of arcuate supports or cradles 80 and 82. The tank 12 is then positioned within such cradles and is welded thereto to provide a firm unitary structure of the tank and support frame.

A discharge pipe 84 may be provided at the rear of tank 12, and a manually operable valve 86 may be positioned therein to control fluid flow from tank 12 through the discharge pipe 84. A filling pipe 87 may be provided at the other end of tank 12 for filling such tank as will hereinafter become apparent.

To raise the tank 12 to its uppermost position, suitable power means in the form of a block and tackle 90 is provided. A support arm 92 is provided at the rear of frame 10, such arm extending upwardly and to the rear as shown in the drawings. The lower end portion of support arm 92 is firmly secured to frame member 18 as by welding or the like.

The upper end 92a of arm 92 is provided with a series of pulleys 94. In like fashion, a corresponding number of pulleys 96 are provided at the hinge or angle member 72 between the support members 54 and 56. The pulleys 96 are rotatably mounted on a shaft 96a which is fastened to a pair of mounting plates 96b and 96c. Such plates, of course, as shown in FIGURES 1 and 5 of the drawings, are welded to the hinge member 72.

A single pulley 98 is rotatably mounted near the base of arm 92 by means of suitable brackets welded to such arm. A line or cable 100 is suitably threaded over the pulleys 94 and 96, and has one end 100a fastened to the upper end 92a of arm 92 as shown in FIGURE 5 of the drawings. The line 100 extends downwardly along arm 92 and is positioned about the pulley 98.

Support wires as shown at 102 and 104 may be employed for supporting the entire structure after the tank 12 has been raised to its elevated position.

To support the tank when it is in its lowermost position, as will hereinafter be explained, there is provided stanchions 106 and 108 at the forward end of main frame 10 and stanchions 110 and 112 at the intermediate section of such frame. Suitable support members, as shown, extending between the stanchions and the main frame 10 are provided to afford the desired strength and rigidity.

Figure 2:
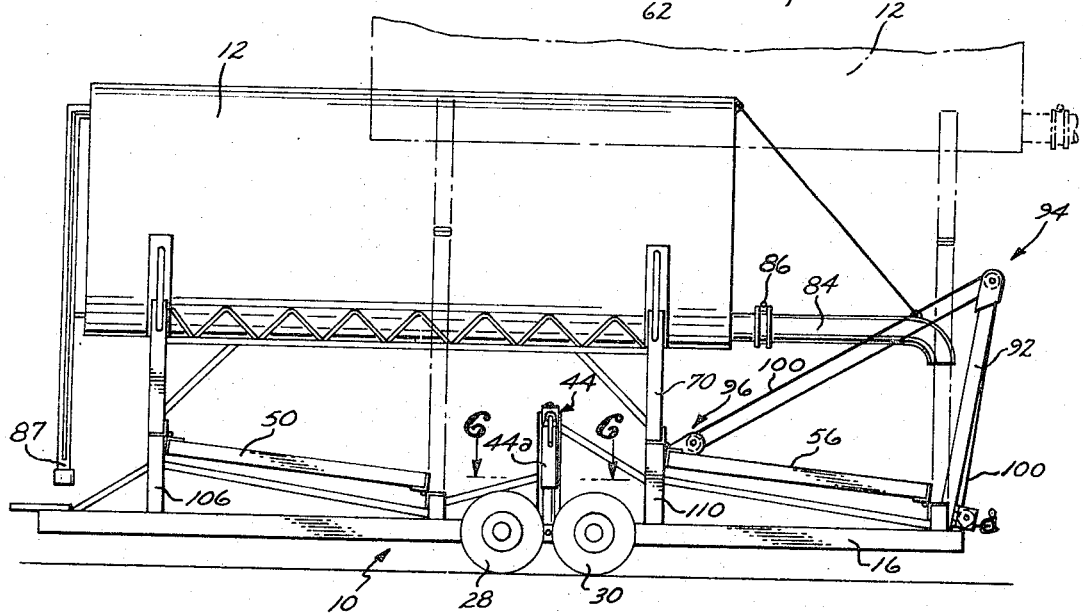
FIGURE 2 is a side elevational view of the source of fluid of FIGURE 1.

When the tank 12 is in its lowermost position, the entire structure is as shown in FIGURE 2 of the drawings. The various support members 50, 52, 54 and 56 are positioned substantially horizontally as shown therein. Also, the vertical members of the support frame 58 are in alignment with the appropriate stanchions 106, 108 110 and 112. As shown in FIGURE 2 the structural member 70 thus rests upon the stanchion 110 while the forward vertical structural member of the support frame 58 rests on stanchion 106.

As viewed in FIGURE 2 when the support members 50 52, 54 and 56 are in their substantially horizontal positions, the respective hinges are open. Also, the support wires 102 and 104 are released at this time and the cable 100 of the block and tackle mechanism may also be relieved of tension.

The filling hose 87 of tank 12 may then be used to fill the latter to the desired level. Thereafter, the entire unit is pulled to the job site, the tank 12 remaining in its lowermost position throughout such transporting. The wheels, of course, are in engagement with the roadway so as to retain the main frame 10 a fixed distance therefrom.

When the job site is reached, it is a simple matter to firmly anchor the frame in a given position on the ground and to cause the wheels to be relieved of the pressures incidential to supporting the tank and its contents. This, of course, is accomplished by rotating the manual lever 46 until the actuating means on either side of the main frame 10 lowers the main frame 10 onto the ground.

With the frame thus anchored, the tank 12 can be raised to its elevated position merely by pulling on the cable 100. To accomplish this, the free end of the cable is attached to a tractor or truck which can exert a relatively strong force thereon.

The block and tackle 90 provides a relatively high mechanical advantage so that, in spite of the relatively high weight of the tank and its contents, the entire structure is ultimately pulled to its vertical position. When this happens, the support frame and tank are raised from the solid line position shown in FIGURE 2, to the broken line position shown therein. At the same time, the hinges associated with the various support members 50, 52, 54 and 56 are caused to be closed, the entire tank structure thus moving toward the rear of the main frame to the elevated position shown in FIGURE 1. The support members are thus aligned with the various structural members on the frame 10 and the support frame 58 as shown.

When the tank has been raised to its elevated position, the flexible line 102 should be connected, such line retaining the tank in its vertical position. Also, the block and tackle can be used to retain the tank in such position merely by suitably anchoring the free end of cable 100 in a fixed position.

Thereafter, trucks and other mobile fluid carriers can be driven to a position beneath the discharge pipe 84, and by suitable manipulation of valve 86 can be filled with fluid from tank 12. It should be noted in this regard that discharge pipe 84 is extended beyond the rear of frame 10 when the tank 12 is in its vertical or elevated position. On the other hand, when the tank 12 is in its lowermost position, such discharge pipe is effectively retracted from such extended position, the retracted position being shown most clearly in FIGURE 2 of the drawings.

When the tank 12 is empty and it is necessary to refill the same, it is a simple matter to release the line 102 and thereafter lower the tank by releasing the tension on cable 100. The tank is thus returned to its lowermost position as shown in FIGURE 2.

The wheels 28, 30, 32 and 34 can then be placed in operating position merely by suitable rotation of manual lever 46. This causes elevation of the main frame 10 so that the entire unit can then be pulled along a road by a truck, tractor or the like.

It is thus seen that the present invention provides a portable source of fluid having novel means for anchoring the entire unit at a job site, and for actuating the tank between its raised and lowered positions.

Although I have shown and described certain specific embodiments of my invention, I am fully aware that many modifications thereof are possible. My invention, therefore, is not to be restricted except insofar as is necessitated by the prior art and by the spirit of the appended claims.

I claim:

1. A portable source of fluid to fill mobile fluid carriers comprising in combination, a main frame, a support frame carried by said main frame in raised and lowered positions, a fluid tank on said support frame to be moved therewith, at least three elongated support members operatively interposed between said main and support frames, a hinge at one end of each member connected thereto and to the support frame at a position spaced from such hinges of other support members, each of said hinges being so connected to said support members and support frame as to permit the latter to be horizontal while being raised and lowered to cause all of said support members to be parallel, a hinge at the other end of each support member connected thereto and to said main frame at spaced positions thereon to cause said main and support frame to be parallel in both raised and lowered positions and said support members to be parallel to each other, said hinges being so positioned on said frames and support members to confine relative movement therebetween to approximately ninety degrees, a support arm connected to said main frame and extending upwardly therefrom, a source of power operatively interposed between said support arm and said support members and comprising a first plurality of pulleys on said support arm and a second plurality of pulleys on said support members having an elongated line extending therebetween for causing the support members to be raised to their vertical positions with said support frame and tank thereon, and retractable wheels on said main frame for transporting the same on a given surface and including manual operating means for raising and lowering the wheels as desired, retraction of said wheels causing said main frame to rest on the ground so that pulling on said line causes said support frame and tank thereon to be moved to raised position.

2. A portable source of fluid to fill mobile fluid carriers according to claim 1 wherein said retractable wheels comprise manual operating means fixed to said main frame and having a vertically movable mounting member on either side of said main frame, each of said mounting members having a pair of wheels attached thereto, and positioning means interposed between each of said mounting members and said main frame to limit the respective mounting member to vertical movement.

3. A portable source of fluid to fill mobile fluid carriers according to claim 2 wherein said positioning means comprises a pair of interlocking members, one of which is connected to said main frame and the other of which is connected to the respective mounting member, said interlocking members preventing movement of said mounting member in all directions other than vertical.

4. A portable source of fluid comprising in combination, a main frame, a support frame, a fluid tank on said support frame, at least three elongated parallel support members operatively interposed between said main and support frames, a hinge at each opposite end of each support member connected to said main and support frames, respectively, to restrict movement of said support members between horizontal and vertical positions while said frames remain relatively parallel throughout such movement, a support arm connected to said main frame, a source of power operatively interposed between said support arm and said support members comprising a block and tackle for raising said support members to vertical positions with said support frame and tank thereon, and retractable wheels on said main frame for normally transporting the same on a given surface and including manual means for retracting said wheels from normal operating positions, retraction of said wheels causing said main frame to rest on the ground so that said block and tackle can be operated to cause said support frame and tank thereon to be moved to raised position.

5. A portable source of fluid according to claim 4, wherein said main and support frames are formed with vertical support posts for contiguous arrangement with said support members when the latter are in vertical position for support of said tank and fluid therein.

6. A portable source of fluid according to claim 5, wherein said main frame is provided with additional support posts for contiguous arrangement with said support posts on said support frame when the latter is in lowered position for support of said tank and fluid therein during transport.

References Cited

UNITED STATES PATENTS

| | | | |
|---|---|---|---|
| 679,827 | 8/1901 | Brown | 187—8.72 |
| 2,566,393 | 9/1951 | Wolfe | 280—43.21 X |
| 2,648,546 | 8/1953 | Falkenhagen | 280—43.23 X |
| 2,712,874 | 7/1955 | Murray | 254—10 X |
| 2,901,216 | 8/1959 | Bender | 254—10 X |
| 3,026,970 | 3/1962 | Woolslayer et al. | 187—8.72 |
| 3,147,023 | 9/1964 | Raymo | 280—43.23 |
| 3,160,171 | 12/1964 | Klein | 280—43.23 X |
| 3,266,675 | 8/1966 | Willis | 222—160 |

FOREIGN PATENTS

| | | |
|---|---|---|
| 801,630 | 9/1958 | Great Britain. |

LEO FRIAGLIA, *Primary Examiner.*